(No Model.) 4 Sheets—Sheet 1.
E. TYDEN.
SAW FILING MACHINE.
No. 378,060. Patented Feb. 14, 1888.
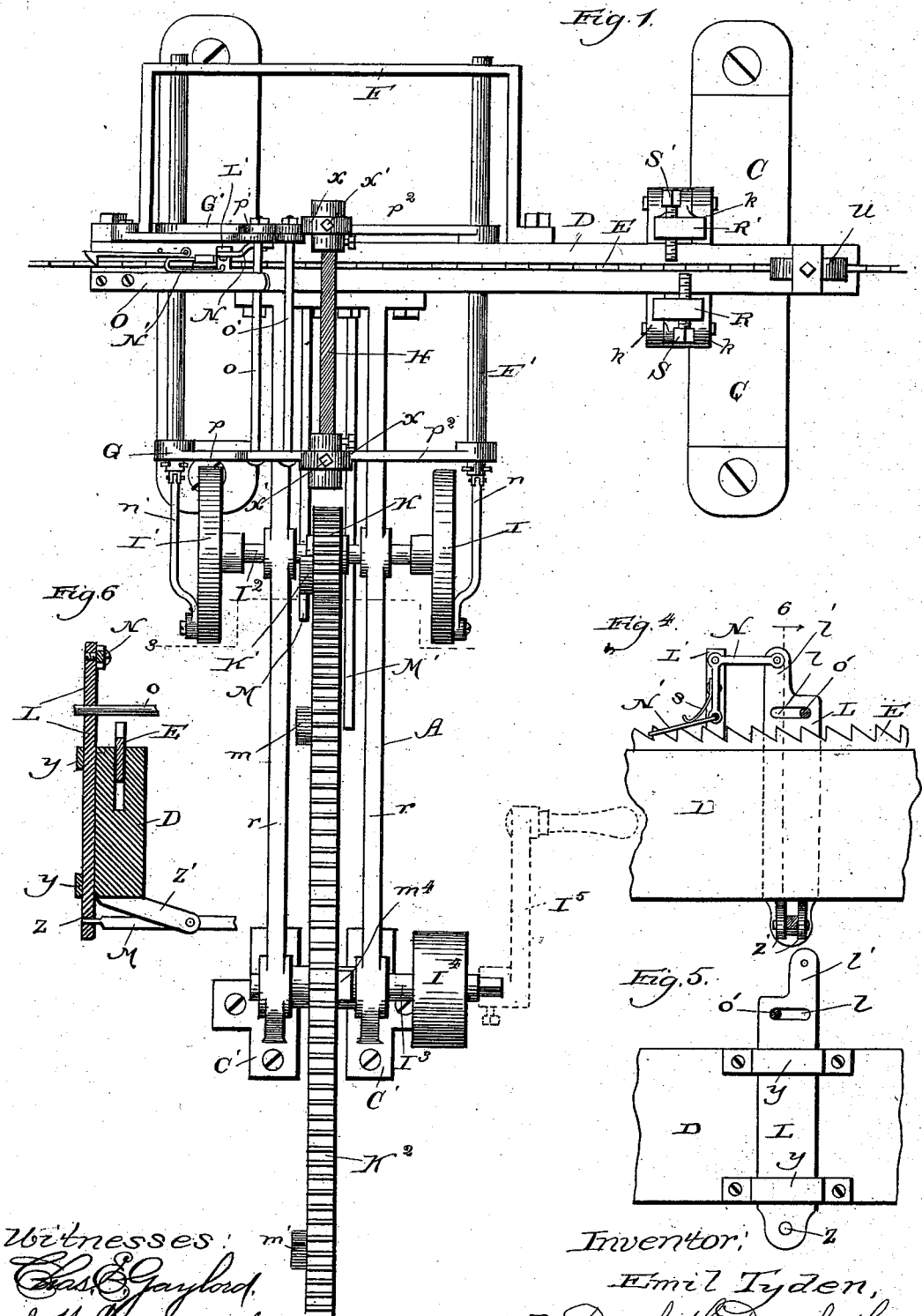
Witnesses:
Chas. E. Gaylord
J. H. Dyrenforth
Inventor:
Emil Tyden,
By Dyrenforth & Dyrenforth
Attys.

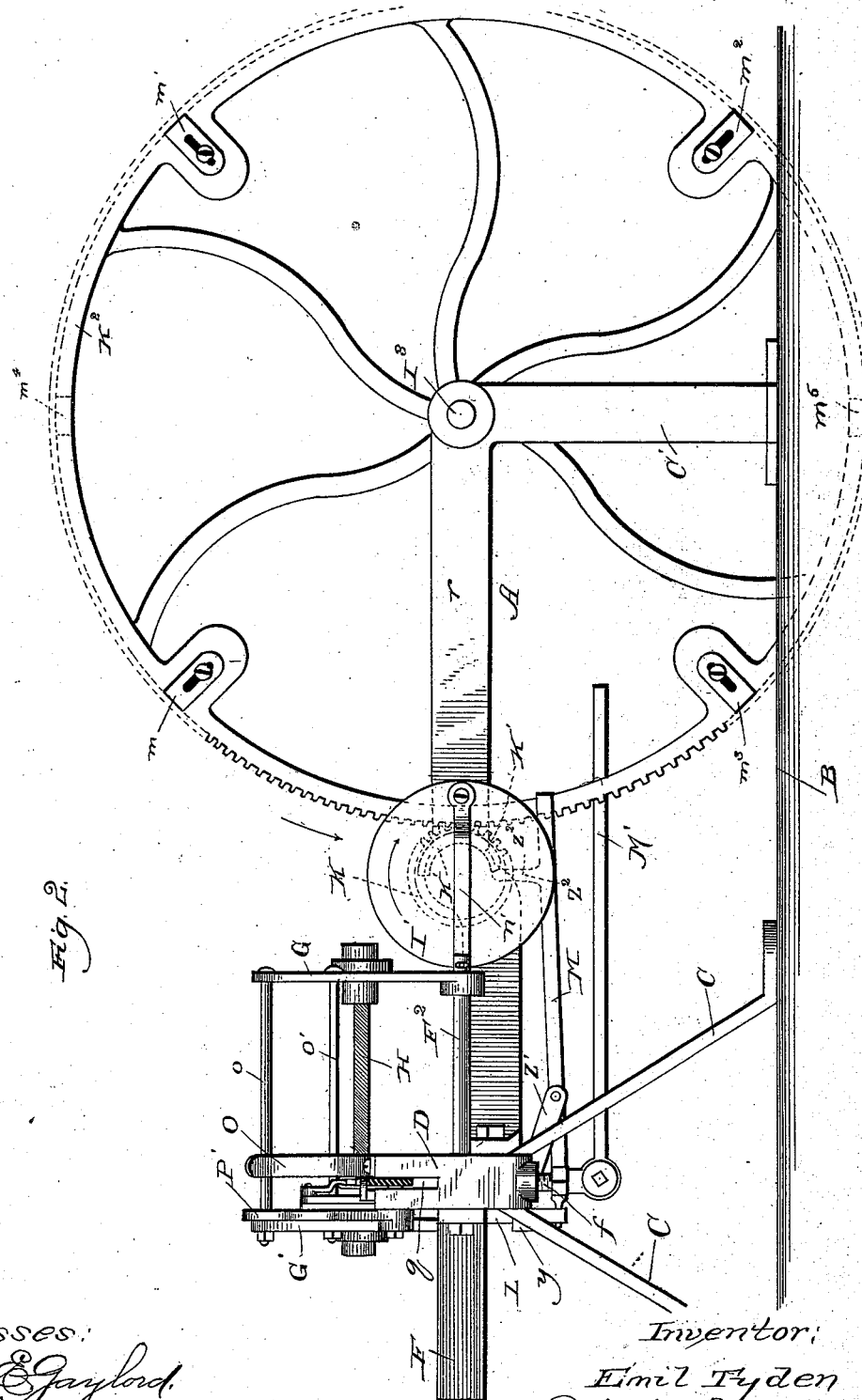

(No Model.) 4 Sheets—Sheet 3.
E. TYDEN.
SAW FILING MACHINE.
No. 378,060. Patented Feb. 14, 1888.
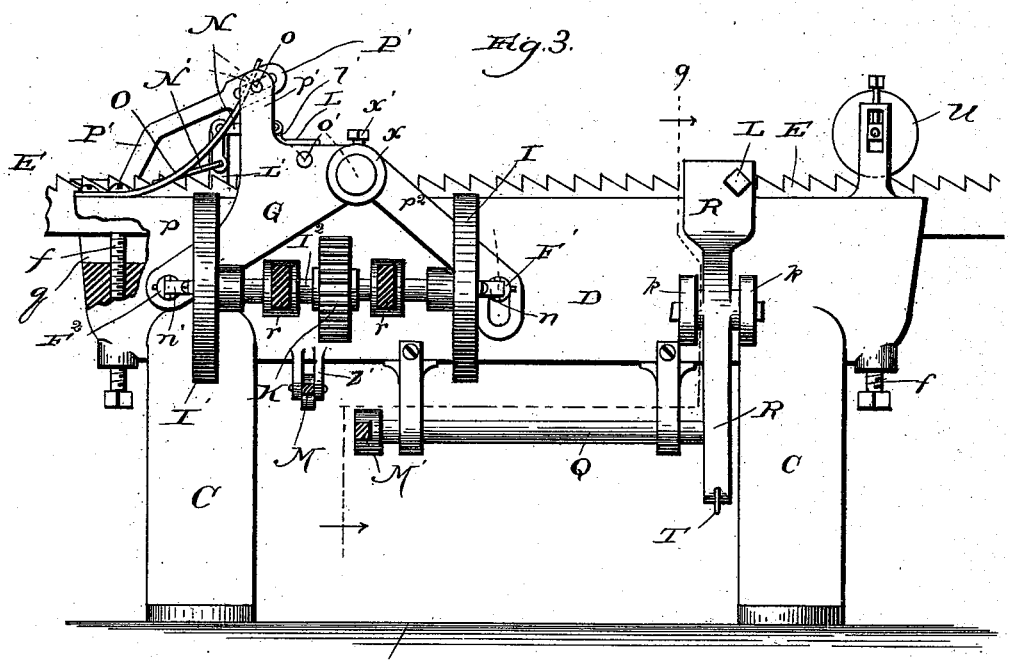
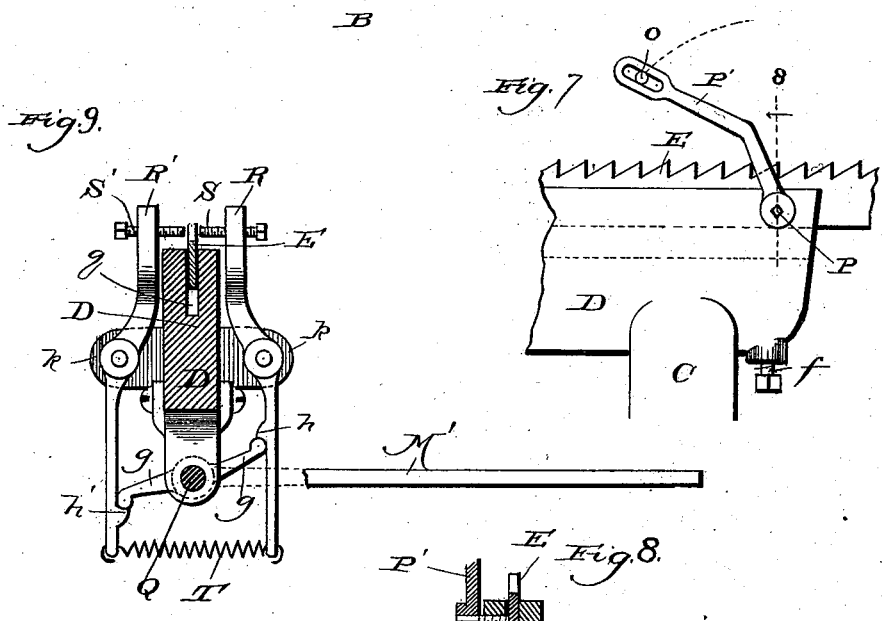
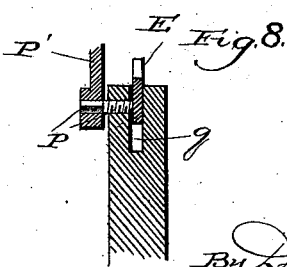
Witnesses:
Chas. E. Gaylord
J. N. Dyrenforth
Inventor:
Emil Tyden.
By Dyrenforth & Dyrenforth,
Attys.

(No Model.) 4 Sheets—Sheet 4.
E. TYDEN.
SAW FILING MACHINE.
No. 378,060. Patented Feb. 14, 1888.
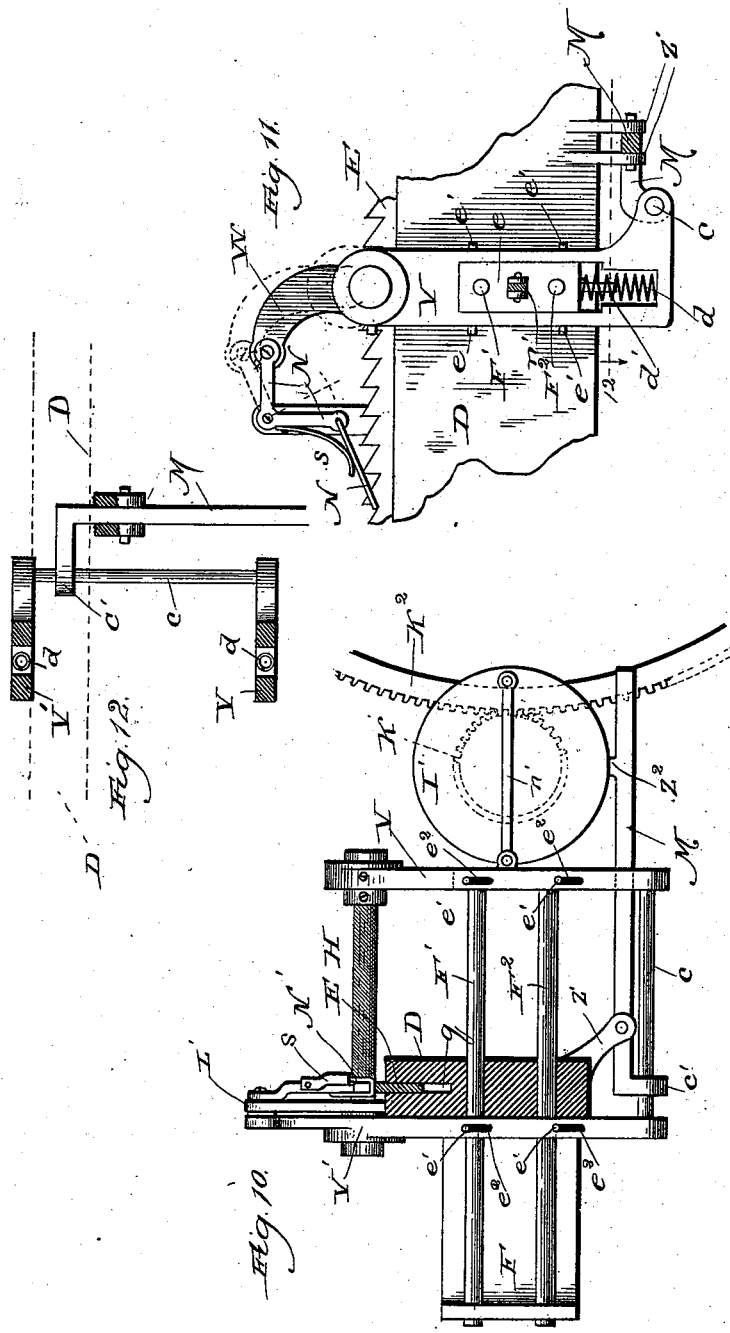
Witnesses:
Chas. E. Gaylord.
J. W. Dyrenforth
Inventor:
Emil Tyden.
By Dyrenforth & Dyrenforth,
Attys.

UNITED STATES PATENT OFFICE.

EMIL TYDEN, OF CHICAGO, ILLINOIS.

SAW-FILING MACHINE.

SPECIFICATION forming part of Letters Patent No. 378,060, dated February 14, 1888.

Application filed April 26, 1887. Serial No. 236,143. (No model.)

*To all whom it may concern:*

Be it known that I, EMIL TYDEN, a subject of the King of Sweden, residing at Chicago, in the county of Cook and State of Illinois, have invented a certain new and useful Improvement in Saw-Filing Machines; and I hereby declare the following to be a full, clear, and exact description of the same.

It is my object to provide a machine for sharpening and also for setting saw-teeth automatically.

My invention consists in the general construction of my improved machine; and it also consists in details of construction and combinations of parts, all as hereinafter more fully set forth.

Referring to the drawings, Figure 1 is a plan view of my improved machine; Fig. 2, an end elevation of the same, showing the saw in section; Fig. 3, a sectional partly-broken side elevation of the same, taken on the line 3 of Fig. 1, and viewed in the direction of the arrow; Fig. 4, a broken partly-sectional side elevation showing the feed mechanism for a band-saw; Fig. 5, a similar view showing a rear elevation of the means illustrated in Fig. 2 for actuating the feed mechanism; Fig. 6, a section taken on the line 6 of Fig. 4 and viewed in the direction of the arrow; Fig. 7, a broken detail view of the holding mechanism shown at the left-hand side of Fig. 3, but presenting the reverse side from that shown therein; Fig. 8, a section taken on the line 8 of Fig. 7 and viewed in the direction of the arrow; Fig. 9, a section taken on the line 9 of Fig. 3, viewed in the direction of the arrows, and illustrating the saw-set device; Fig. 10, a broken sectional end elevation of the machine, illustrating a modification; Fig. 11, a broken side elevation of the same, and Fig. 12 a section taken on the line 12 of Fig. 11 and viewed in the direction of the arrow.

A is the frame of the machine, supported on a bed or table, B, and having legs C at the left-hand end and C' at the opposite end, the former carrying a transverse head, D, provided with a longitudinal groove or recess, $q$, in its upper side, as shown, and connected toward one end with the rear legs, C', by parallel horizontal bars $r$, bent, as shown, toward the forward ends and forming part of the frame of the machine. Within the recess in the head D is a band-saw, E. Extending from the left or outer side of the head D is a bracket, F, affording bearings for two parallel horizontally-reciprocating rods, F' and $F^2$, extending backward through the body of the head D below the longitudinal recess $q$ therein, the head thus also affording bearings for the reciprocating rods. The rods F' and $F^2$ form the base of a reciprocating frame, comprising on the right or rear side of the head D a bracket, G, formed with arms $p$, $p'$, and $p^2$, extending in the directions shown from the body portion; on the outer side of the head an exactly similar bracket, G', which, because of its similarity to the bracket G, is not shown in detail in the drawings; a rod, $o$, connecting the arms $p'$ of the two brackets G and G', and a rod, $o'$, connecting the brackets at the body portion, as indicated in Fig. 3. The rod $F^2$ extends at its rear end and projects through the lower ends of the arms $p$, being secured in position, and the rod F' extends through the slotted ends of the arms $p^2$ of the two brackets G and G'. At the junction of the arms $p^2$ with the body portions of the brackets G and G' are sockets $x$, to receive opposite ends of a file, H, and provided with set-screws $x'$, whereby the file is secured in place at its opposite ends.

I and I' are pulleys or wheels of equal diameter corresponding, or nearly so, to the extent of horizontal play of the reciprocating frame carrying the file, and supported on a rotary shaft, $I^2$, carried by the bars $r$. The wheels I and I' are connected from near their peripheries—that is, eccentrically—by links $n$ and $n'$, with the ends of the rods F' and $F^2$, as shown, which project backward through the bracket G. Between the bars $r$ on the shaft $I^2$, to rotate with it, is a pinion, K, having thirty teeth, and on one side a cam, K', which extends half-way around the face or side upon which it is provided; and $K^2$ is a gear-wheel, having two hundred and forty teeth engaging with the pinion K to produce eight revolutions of the latter with each of its own revolutions, and supported on a rotary shaft, $I^3$, carried by the bars $r$ toward their rear ends, and provided with a belt-pulley, $I^4$, for connection with a driving-power or with a crank, $I^5$, to permit the machine to be operated by hand.

Equidistant apart on the gear-wheel K² at the side corresponding with that of the pinion K, having the cam K' upon it, and near the periphery, are four radial and adjustable sliding blocks, forming strikers $m$ $m'$ $m^2$ $m^3$, and midway between the blocks $m$ and $m'$ and $m^2$ and $m^3$, respectively, but on the opposite side of the wheel, are similar blocks, $m^4$ and $m^5$, these blocks serving purposes hereinafter set forth. On the left or outer side of the head D is a vertically-reciprocating plate or bar, L, (see Figs. 4 and 5,) movable in guide-straps $y$, secured to the side of the head and having toward its upper end, below the reduced portion $l'$, a transverse slot, $l$, through which extends the rod $o'$ of the reciprocating file-carrying frame. In the lower end of the bar L is an opening, $z$, Fig. 6, flaring at both extremities to receive the reduced end of a lever, M, pivoted to form a fulcrum to a bracket, $z'$, extending backward from the under side of the head D. The lever M extends backward into the path of the blocks $m$, $m'$, $m^2$, and $m^3$ on the wheel K², and is provided with a transverse finger, $z^2$, Fig. 2, to be engaged by the cam K' on the pinion K. A bell-crank lever, N, is pivoted at one extremity near the extremity of the reduced portion of the bar L, and at its angle to an upright strip, L', rigidly secured to the outer or left side of the head D, and at its opposite end the bell-crank lever carries a hooked link, N', to engage with the teeth of the saw E, with which it is held in contact by means of a spring, $s$, on the arm of the lever N, to which it is connected. (See Fig. 4.)

O is a flat spring extending from the upper face of the head D, to which it is secured near one end at the inner or right side of the recess $q$ against the rod $o$, and tending thereby to maintain the reciprocating frame in normal position and to return it when raised therefrom to permit clearance of the saw-teeth by the file in its backward or return movement and the operation of the automatic feed, all as hereinafter described.

A screw, P, Figs. 7 and 8, works in an opening in the outer side of the head D, near the hooked end of the link N', to hold the saw while being filed and to release it when the feed mechanism operates, the screw being turned by an arm, P', connected at one end with the screw and slotted in its opposite end, where it surrounds the rod $o$.

The saw-set mechanism is shown in detail in Fig. 9. Toward the end of the head D opposite that upon and about which the mechanism already described is provided are two bent arms, R and R', pivoted near their centers to bearings $k$ on opposite sides of the head to extend above and below the latter, being held in normally relative position at their lower ends by a helical spring, T, and carrying near their upper ends set-screws S and S', forming adjustable setting-points, extending preferably on the same plane toward opposite sides of adjacent teeth of the saw. The arm R is provided on its inner side with a shoulder, $h$, facing downward, and the arm R' with a similar shoulder, $h'$, lower than the shoulder $h$ and facing upward, the shoulders being respectively engaged by opposite extremities of an oscillatory lever, $g$, secured near its center to a rock-shaft, Q, near one end of the same, supported in bearings extending downward from opposite sides of the head D, the opposite end of the shaft carrying a lever, M', which extends therefrom backward into the path of the striker-blocks $m^4$ and $m^5$ on the gear-wheel K².

To describe the working of the machine the operation may be stated, in general terms, to involve the filing of a saw-tooth with each backward movement of the file, and while the saw is automatically held to lift the file and hold it during its forward movement out of contact with the saw-tooth filed by it, and before it again begins to move backward raise it suddenly farther out of contact with the saw, and thereby operate the feeding mechanism to bring the next succeeding tooth of the saw into the path of the file, and between each two succeeding feeding operations to set two teeth at a time by bending them simultaneously in opposite directions. The saw E to be sharpened is introduced at one end into the recess $q$ of the head D, its height with reference to the file H being regulated by means of set-screws $f$, extending into the recess $q$ from the under side of the head D, near its opposite ends, and an adjustable roller, U, having rubber on its periphery, is supported near the end of the head toward which the saw is fed to hold the latter down against possible displacement.

The machine is set in motion by turning the shaft I³ to cause the gear-wheel K² to rotate in the direction indicated by the arrow in Fig. 2, whereby the pinion K and wheels I and I' are rotated in the opposite direction. As illustrated in Figs. 1 and 2 of the drawings, the wheels I and I' have in their rotation attained a position wherein they have moved the frame carrying the file H to the extremity of its backward movement and by their continued rotation are about to move the file carrying frame forward. In the relative positions of the parts named the cam K' on the pinion K engages with the finger $z^2$ on the lever M, thereby depressing the latter and holding it down until the opposite end of the cam clears the finger $z^2$, when the file and frame-work carrying it will have reached the end of its forward stroke.

The effect of depressing and holding down the lever M, as described, is to raise slightly the bar L, and with it the rod $o'$, which slightly tilts the brackets G and G', thereby raising the file H out of contact with the saw. This operation is not sufficient to actuate the feeding and holding mechanism, the rise being very slight, merely to raise the file about one thirty-second to one-sixteenth of an inch, and there being sufficient lost motion in the connections with the reciprocating frame-work of the feeding and holding mechanism to avoid disturbance of them.

Just before the cam K' clears the finger $z^2$ the striker-block $m$ on the gear-wheel makes contact with the end of the lever M in its path, thereby lowering it farther than it can be lowered by the cam K', the effect being to raise the vertically-movable bar L sufficiently far to raise at the rod $o'$ the file and framework, carrying it to a height that will cause the file to clear the points of the teeth, and thereby turn the bell-crank lever N on its pivot to move the vertical arm thereof inward, and with it the hooked link N', which drags or pulls the saw or feeds it to bring the next tooth into position in the path of the reciprocating file as the latter moves backward. The blocks $m$, $m'$, $m^2$, and $m^3$ are adjustable to project any distance upon the gear-wheel $K^2$ to produce clearance of the file of saw-teeth of any length. The same movement which actuates the feed turns the arm P' in a direction which "loosens" the screw P, thereby releasing the saw and permitting it to be fed, and the return of the file into contact with the saw-tooth to be operated upon by the clearance by the striker $m$ of the lever M, assisted by the flat spring O, tightens the screw P to cause it to perform its normal function of holding the saw while being filed.

The operations thus described of actuating the holding and feed mechanism to release and feed the saw are performed four times in each revolution of the gear-wheel $K^2$, as will be understood without further description. Of course the number of revolutions of the pinion is in proportion to the relative size of the gear-wheel $K^2$, which may correspond with the pinion or be any number of times larger than the pinion.

When the saw has been released and fed, as described, and while the file is being moved forward, at the end of each second such movement a block, $m^4$ or $m^5$, strikes the rear end of the lever M', depressing it, and thereby turning the rock-shaft Q, which turns the arm $g$ toward a horizontal position, spreading the arms R and R' below their pivotal points and causing them to approach above the same, whereby the set screws are forced against opposite sides of two adjacent saw-teeth and set them. When the block $m^4$ or $m^5$ clears the lever, the spring T returns the arms $h$, $h'$, and $g$ to their normal relative positions.

The modification shown in Figs. 10 to 12, inclusive, shows a simpler construction of the reciprocating frame-work carrying the file and feed mechanism than that shown in the other figures and hereinbefore described. Two parallel bars, V and V', are supported on opposite sides of the head D by the rods F' and $F^2$, one above the other, and extending through blocks $e$ in recesses formed in the faces of the blocks V and V', and having lateral pins $e'$ near opposite ends on both edges which extend through slots $e^2$ in the edges of the blocks V and V', whereby the latter are guided in their vertically-reciprocating movement. Beneath each block $e$ in the slot in the respective bar V or V' is confined a helical spring, $d$, surrounding a guide-extension, $d'$, and tending to force down the bars V and V' when raised by actuating the lever M in the manners already described. The wheel I' (one only being required in the present construction) is connected by the link $n'$ with the block $e$ in the bar V, as shown, and moves the bars V V', blocks $e$, and parts which they carry back and forth with the rods F' and $F^2$. The file H is supported at opposite ends, as shown, in the bars V and V', which are connected at their lower ends by a rod, $c$, surrounded by the annular head $c'$ of the lever M. The bar V is provided on its upper end with a curved finger, W, to which the horizontal arm of the bell-crank lever N is connected, as with the vertically-reciprocating bar L in the other construction.

When the lever M is actuated by the cam K' on the pinion K, it raises the bars V and V' against the resistance of the springs $d$ sufficiently to raise the file H out of contact with the teeth of the saw, and when actuated by the striker-blocks $m$, $m'$, $m^2$, and $m^3$ on the gear-wheel $K^2$ it raises the blocks V and V' sufficiently to cause the finger W to tilt the bell-crank lever N and actuate the feed. When the lever M is released, the springs $d$ by their resilience force the bars V and V' back into their normal positions to produce contact of the file with the saw-tooth in its path.

While my machine is shown as adapted to the filing and feeding of the teeth of band-saws, it could readily be adapted, without departing from the spirit of my invention, to operate upon circular saws by causing the feed mechanism to rotate the saw instead of moving it lengthwise, as in the case of a band-saw.

What I claim as new, and desire to secure by Letters Patent, is—

1. In a saw-filing machine, the combination of a reciprocating frame carrying a file and adapted to be automatically elevated and lowered, a stationary head to support the saw while being operated upon, a pivotally-supported bell-crank lever connected toward one end with the said frame and adapted to engage from its opposite end with a saw-tooth, a rotary cam, and a lever connected near one end with the said frame and extending at its opposite end into the path of the rotary cam, substantially as and for the purpose set forth.

2. In a saw-filing machine, the combination of a reciprocating frame carrying a file and adapted to be automatically elevated and lowered, a stationary head to support the saw while being operated upon, and a pivotally-supported bell-crank lever connected at one arm with the said frame and carrying on its other arm a hooked link to engage with a saw-tooth, substantially as and for the purpose set forth.

3. In a saw-filing machine, the combination of a reciprocating frame carrying a file, H, and adapted to be automatically elevated and lowered, a stationary head, D, to support the saw while being operated upon, an automatic feed connected with the said file-carrying frame and actuated intermittently by the rise of the said frame to feed the saw, a set-screw, P, and a lever, P', connected with the said set-screw and with the said frame, substantially as and for the purpose set forth.

4. In a saw-filing machine, the combination of a reciprocating frame carrying a file, H, and adapted to be automatically elevated and lowered, a stationary head, D, to support the saw while being operated upon, an automatic feed connected with the said file-carrying frame and actuated intermittently by the rise of the said frame to feed the saw, a rock-shaft, Q, actuated intermittently by the driving-power of the machine, an oscillatory lever, $g$, on the rock-shaft, and pivotal arms R and R', supported on opposite sides of the head D and yieldingly maintained in contact with the ends of the lever $g$, and carrying setting-points S and S', substantially as and for the purpose set forth.

5. In a saw-filing machine, the combination of a horizontally-reciprocating frame carrying a file, H, adapted to be automatically elevated and lowered, a stationary head, D, to support the saw while being operated upon, a rotary gear-wheel, $K^2$, carrying a striker-block, a rotary pinion, K, in mesh with the gear-wheel and connected with the said frame to reciprocate it, a cam, K', on the pinion, a lever, M, extending into the paths of the said striker-block and cam, and a pivotally-supported bell-crank lever, N, connected at one arm with the said frame and carrying on its other arm a hooked link, N', to engage with a saw-tooth, substantially as and for the purpose set forth.

6. In a saw-filing machine, the combination of a horizontally-reciprocating frame carrying a file, H, adapted to be automatically elevated and lowered, a stationary head, D, to support the saw while being operated upon, a rotary gear-wheel, $K^2$, carrying an adjustably-sliding striker-block, a rotary pinion, K, in mesh with the gear-wheel and connected with the said frame to reciprocate it, a cam, K', on the pinion, a lever, M, extending into the paths of the said striker-block and cam, and a pivotally-supported bell-crank lever, N, connected at one arm with the said frame and carrying on its other arm a hooked link, N', to engage with a saw-tooth, substantially as and for the purpose set forth.

7. In a saw-filing machine, the combination of a horizontally-reciprocating frame carrying a file, H, adapted to be automatically elevated and lowered, a stationary head, D, to support the saw while being operated upon, a rotary gear-wheel, $K^2$, carrying a striker-block, a rotary pinion, K, in mesh with the gear-wheel and connected with the said frame to reciprocate it, a cam, K', on the pinion, a lever, M, extending into the paths of the said striker-block and cam, a pivotally-supported bell-crank lever, N, connected at one arm with the said frame and carrying on its other arm a hooked link, N', to engage with a saw-tooth, a set-screw, P, and a lever, P', connected at one end with the said set-screw and at its opposite end with the said frame, substantially as and for the purpose set forth.

8. In a saw-filing machine, the combination of a horizontally-reciprocating frame carrying a file, H, adapted to be automatically elevated and lowered, a stationary head, D, to support the saw while being operated upon, a rotary gear-wheel, $K^2$, carrying striker-blocks on opposite sides, a rotary pinion, K, in mesh with the gear-wheel and connected with the said frame to reciprocate it, a cam, K', on the pinion, a lever, M, extending into the paths of a striker-block on one side of the gear-wheel and cam, a pivotally-supported bell-crank lever, N, connected at one arm with the said frame and carrying on its other arm a hooked link, N', to engage with a saw-tooth, a lever, M', extending into the path of a striker-block on the opposite side of the gear-wheel, and a saw-set actuated by the said striker-block through the said lever M', substantially as and for the purpose set forth.

9. In a saw-filing machine, the combination of a horizontally-reciprocating frame carrying a file, H, adapted to be automatically elevated and lowered, a stationary head, D, to support the saw while being operated upon, a rotary gear-wheel, $K^2$, carrying striker-blocks on opposite sides, a rotary pinion, K, in mesh with the gear-wheel and connected with the said frame to reciprocate it, a cam, K', on the pinion, a lever, M, extending into the paths of a striker-block on one side of the gear-wheel and cam, a pivotally-supported bell-crank lever, N, connected at one arm with the said frame and carrying on its other arm a hooked link, N', to engage with a saw-tooth, a rock-shaft, Q, carrying near one end a lever, M', extending into the path of a striker-block on the opposite side of the gear-wheel, an oscillatory lever, $g$, on the rock-shaft toward its opposite end, and pivotal arms R and R', supported on opposite sides of the head D and maintained in contact with the opposite ends of the lever $g$ by a spring, T, and carrying near their upper ends set-screws S and S', the whole being constructed and arranged to operate substantially as and for the purpose set forth.

10. In a saw-filing machine, the combination of a frame, A, a head, D, having a recess, $q$, to receive the saw to be sharpened and provided with means for adjusting the saw in position in the recess, a horizontally-reciprocating frame carrying a file, H, and adapted to be automatically elevated and lowered, and comprising brackets G and G' at opposite sides of the head D, rods $o$ and $o'$, and rods F' and $F^2$, a rotary gear-wheel, $K^2$, carrying adjustable striker-blocks $m$, $m'$, $m^2$, and $m^3$ on one side and striker-blocks $m^4$ and $m^5$, on the opposite side, a rotary pinion, K, on a shaft, $I^2$, and in mesh with the gear-wheel and provided with a cam, K', wheels I and I' on the shaft with the pinion and connected eccentrically with the rods F' and $F^2$, a vertically-movable bar, L, having a slot, $l$, through which the rod $o'$ extends, a pivotally-supported bell-crank lever, N, having one arm connected with the bar L and carrying on its opposite arm a hooked link, N', a set-screw, P, extending laterally into the recess $q$, a lever, P', connected at one end with the screw P and at its opposite slotted end with the rod $o$, a spring, O, a lever, M, connected at one end with the bar L and extending thence into the paths of the cam K' and striker-blocks $m$, $m'$, $m^2$, and $m^3$, a rock-shaft, Q, carrying near one end a lever, M', extending into the paths of the striker-blocks $m^4$ and $m^5$, an oscillatory lever, $g$, on the rock-shaft toward its opposite end, and pivotal arms R and R', supported on opposite sides of the head D, a spring, T, maintaining the said arms normally in contact with opposite ends of the lever $g$, and set-screws S and S', carried by the said arms near their upper ends, the whole being constructed and arranged to operate substantially as and for the purpose set forth.

EMIL TYDEN.

In presence of—
J. W. DYRENFORTH,
GEORGE C. COOK.